United States Patent [19]
Sakakibara

[11] 3,861,490
[45] Jan. 21, 1975

[54] CONSTANT SPEED CONTROL SYSTEM OF VEHICLE TRAVEL

[75] Inventor: Naoji Sakakibara, Chiryu, Japan

[73] Assignee: Aisin Seiki Kabushiki kaisha, Aichi, Japan

[22] Filed: Mar. 30, 1973

[21] Appl. No.: 346,431

[30] Foreign Application Priority Data
Mar. 30, 1972 Japan............................. 47-032376

[52] U.S. Cl. ............................ 180/108, 123/103 R
[51] Int. Cl............................................. B60k 31/00
[58] Field of Search ........................... 180/105–109; 123/102, 103 R, 127

[56] References Cited
UNITED STATES PATENTS

| | | | |
|---|---|---|---|
| 2,991,053 | 7/1961 | Cramer | 123/103 R |
| 3,018,766 | 1/1962 | Francis | 123/103 R |
| 3,021,827 | 2/1962 | Brunner | 123/103 R |
| 3,081,757 | 3/1963 | Cramer | 123/103 R |
| 3,109,507 | 11/1963 | McMurray | 123/103 R |
| 3,249,099 | 5/1966 | Saxby | 123/127 |
| 3,596,642 | 8/1971 | Nakata | 180/105 X |
| 3,647,017 | 3/1972 | Brainard | 180/105 R |
| 3,648,798 | 3/1972 | Jania | 180/105 E |

*Primary Examiner*—David Schonberg
*Assistant Examiner*—Terrance L. Siemens
*Attorney, Agent, or Firm*—Oblon, Fisher, Spivak, McClelland & Maier

[57] ABSTRACT

A system for providing constant speed control of a vehicle having a dual-barrel type carburetor is actuated by a secondary throttle valve associated with vacuum actuated servo means independently of a primary throttle valve mechanically connected to an accelerator pedal.

9 Claims, 2 Drawing Figures

CONSTANT SPEED CONTROL SYSTEM OF VEHICLE TRAVEL

BACKGROUND OF THE INVENTION

1. Field of the Invention

This invention relates generally to speed control systems for vehicles, and more particularly to a constant speed control system of the vehicle travel.

2. Description of the Prior Art

Conventional devices of the character described herein have been arranged such that a primary throttle valve mechanically connected to an accelerator pedal and movable thereby is adapted to be actuated by a vacuum servo device moved fluidically or a motor servo device moved electrically during the constant speed travel condition of the vehicle. This results in the manipulating system for mechanically connecting the accelerator pedal to the primary throttle valve being actuated even when the vehicle is travelling under the constant speed control system of the vehicle. Therefore, the vacuum or motor servo device must provide a manipulating force which is large enough to actuate the manipulating system and thus a large-sized servo device is required. In addition, the primary throttle valve is apt to be provided with two or more return springs because the return movement of the primary throttle valve is required for safe operation. Thus the manipulating force, in order to actuate the manipulating system, is further increased and further increasing of the manipulating force of the servo device is correspondingly required.

Furthermore, it should be noted that the reaction forces act on various sliding portions of the manipulating system, especially on a shaft of the throttle valve, the joined portions of links and the fulcrum portions of the levers thereof. This increases sliding resistances therebetween so that the efficient operation of the throttle valve is reduced and the hysteresis of the throttle valve manipulating system is increased. These reaction forces increase with the increasing of the forces required to operate the manipulating system.

SUMMARY OF THE INVENTION

Therefore, it is an object of the present invention to provide an improved constant speed control system of a vehicle travel speed for obviating the above-mentioned various drawbacks.

It is another object of the present invention to provide an improved constant speed control system of the vehicle travelling speed wherein a carburetor comprises a primary throttle valve mechanically, connected to an accelerator pedal and a secondary throttle the venturi vacuum, and constant speed control means of the vehicle travel is adapted for associating with the secondary throttle valve.

It is a further object of the present invention to provide an improved constant speed control system of the vehicle travelling speed wherein a servo means for the constant speed control means of the vehicle travel is simple in construction and comparatively low in cost.

It is a still further object of the present invention to provide an improved constant speed control system of the vehicle travelling speed wherein the servo means for the constant speed control means of the vehicle travel is arranged to actuate the secondary throttle valve independently of the accelerator pedal so that a small-sized servo means can be employed.

It is another object of the present invention to provide an improved constant speed control system of the vehicle travelling speed wherein the servo means for the constant speed control means of the vehicle travel which is arranged to actuate the secondary throttle valve is further connected to a vehicle speed limiting device so that the servo means acts to cause the secondary throttle valve to close when the actual vehicle speed exceeds a predetermined limit value.

It is still another object of the present invention to provide an improved constant speed control system of the vehicle travelling speed wherein the carburetor comprises the primary throttle valve mechanically connected to the accelerator pedal and the secondary throttle valve actuated by the vacuum servo means in response to the venturi vacuum, and another vacuum servo means is further arranged so as to associate with the constant speed control means, whereby the secondary throttle valve is controlled by another vacuum servo means when the vehicle is travelling under the constant speed control means of the vehicle travel.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several figures, and wherein.

DETAILED DESCRIPTION OF THE PREFERRED EMBODIMENTS

Figure 1:
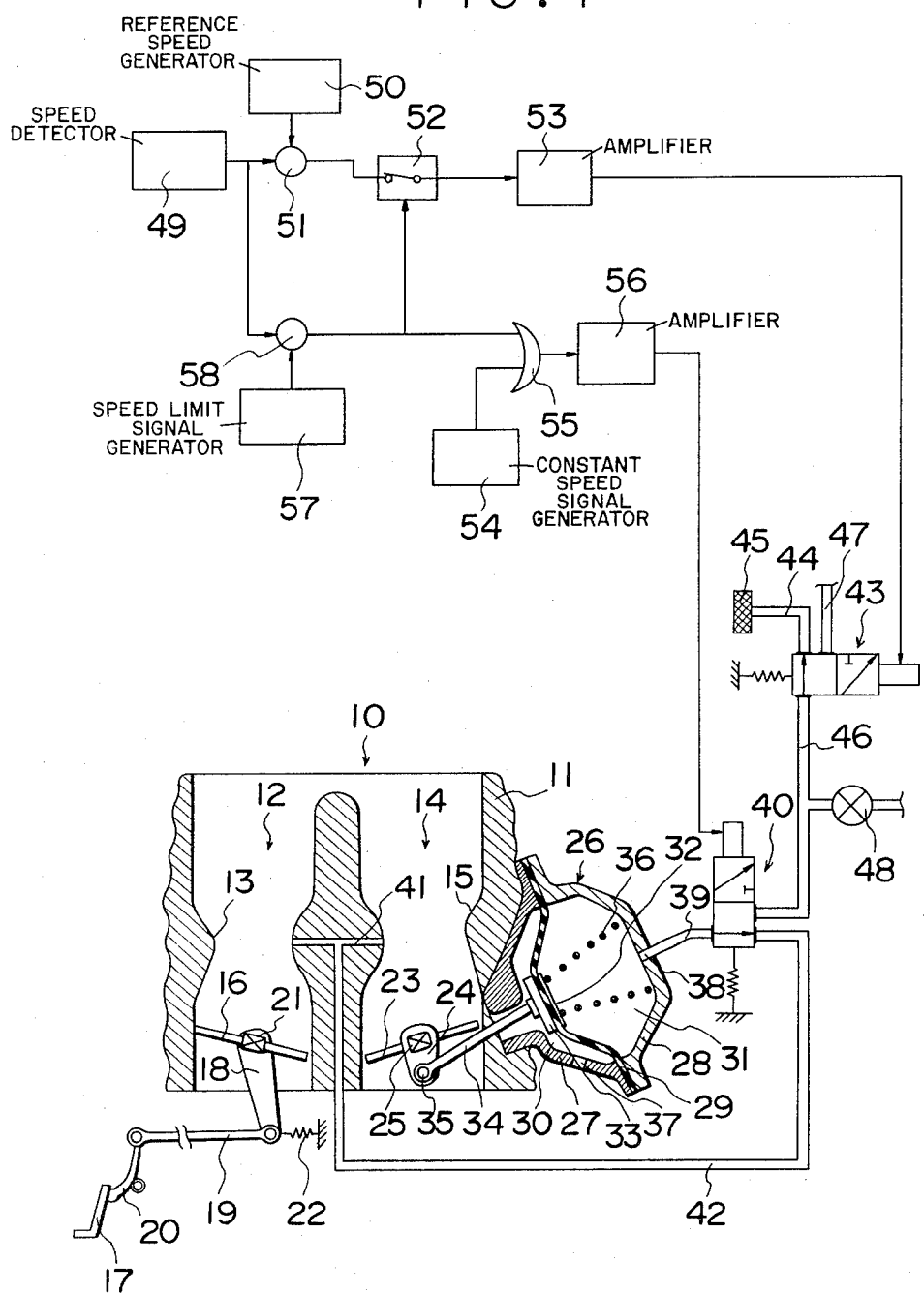
FIG. 1 is a systematical view with parts being shown in cross-section of one embodiment of the present invention.

Referring now to FIG. 1 in which a first preferred embodiment in accordance with the present invention is shown, the numeral 10 designates a dual-barrel compound type carburetor for an internal combustion vehicle engine. The carburetor 10 includes a housing 11 which is formed with a primary barrel 12 having a venturi 13 therein and a secondary barrel 14 having a venturi 15 therein. A primary throttle valve 16 for the primary barrel 12 is mechanically connected to an accelerator pedal 17 and is arranged for conventional control thereby, the primary throttle valve 16 being connected to the pedal 17 through an axis 21, an arm 18, a rod 19 and a link 20. A return spring 22 biases the arm 18 and rod 19 to maintain the primary throttle valve 16 in its idle position.

A secondary throttle valve 23 for the secondary barrel 14 is pivotally mounted on an axis 25 and is operatively connected to a vacuum servo means 26 through an arm 24 so that the secondary throttle valve 23 is arranged for opening and closing by servo means 26.

The servo means 26 comprises housings or casings 27 and 28 having respective ports 37 and 38. A flexible diaphragm piston 29 is inserted between the housings 27 and 28 to thereby define first and second chambers 30 and 31 within the housings 27 and 28, and a connecting control rod 34 having a free end portion connected to the arm 24 by a pin 35 and a retainer portion 33 rigidly connected to the diaphragm piston 29 is provided for opening and closing the secondary throttle valve 23 by displacement of the diaphragm piston 29. A compression spring 36 biases the diaphragm piston 29 through a pressure plate 32 in its illustrated leftward direction. The first chamber 30 always communicates with the atmosphere and the second chamber 31 communicates with the venturi vacuum through the port 38 and passages 39, 42 and 41 during the normal vehicle running condition.

A first solenoid change-over valve 40 associates with means for establishing the constant speed vehicle travel condition, as will be made clear hereinafter, so that upon operation of the establishing means, the first change-over valve 40 is energized so as to establish fluid communication between the passage 39 and a passage 46. A second solenoid change-over valve 43 has a first position in which the passage 46 communicates with a passage 44 and a second position in which the passage 46 communicates with a passage 47. The passage 44 is fluidly connected to an air-filter 45 and the passage 47 is fluidly connected to the vacuum source such as the engine manifold vacuum or the venturi vacuum. Disposed within a branch passage from the passage 46 is further valve 48 being operatively connected with a brake pedal, not shown, the valve 48 being operative so as to introduce the atmospheric pressure into the passage 46 upon the depression of the brake pedal.

An actual vehicle speed detector 49 may be constructed of a generator for generating a voltage responsive to the actual vehicle speed, a pulse generator for generating a series of pulses, each having a width responsive to the actual vehicle speed, or a pulse generator for generating the number of pulses responsive to the actual vehicle speed. A reference vehicle speed responsive signal generator 50 is actuated by a driver in accordance with, or independently of, means for establishing the constant speed vehicle travel condition. The desired vehicle speed responsive signal generator 50 may be constructed of an electric circuit for generating the desired vehicle speed responsive voltage, an electric circuit generating a series of pulses, each having a width responsive to the desired vehicle speed, or an electric circuit for generating the number of pulses responsive to the desired vehicle speed per unit time. The numeral 51 represents a first comparator, such as a voltage comparator, a pulse-width comparator or a counter. The first comparator 51 is coupled to the actual vehicle speed detector 49 and the desired vehicle speed responsive signal generator 50 to deliver a first instructive signal when the actual vehicle speed is slower than the desired vehicle speed. The first signal energizes the second solenoid valve 43 through a normally closed switch 52, such as a relay and a gate, and a conventional amplifier 53. A second instructive signal is delivered by a device 54 for establishing the constant speed vehicle travel condition when the driver manipulates a push-button or the like. The second signal energizes the first solenoid valve 40 through an OR-circuit 55 and a further conventional amplifier 56. A device 57 delivers a predetermined limit signal of the vehicle speed. The device 57 may be constructed of an electric circuit for generating a series of pulses, each having a width responsive to the predetermined limit vehicle speed, or an electric circuit for generating a number of pulses responsive to the predetermined limit vehicle speed. A second comparator 58, such as a voltage comparator, a pulse-width comparator or a counter, delivers an alarm signal when the actual vehicle speed exceeds the predetermined limit vehicle speed. The normally closed switch 52 opens to deenergize the second solenoid valve 43 under control of the alarm signal. The alarm signal also causes energization of the first solenoid valve 40 through the OR-circuit 55 and the amplifier 56.

In the operation of a system arranged as described herein, when the vehicle is travelling under normal travelling conditions, the first solenoid valve 40 is in the position illustrated in FIG. 1 in which the venturi vacuum is introduced into the second chamber 31 of the servo means 26. Therefore, the vehicle speed depends on the opening degrees of both the primary and secondary throttle valves 16 and 23. Namely, the primary throttle valve 16 opens to accelerate the engine in response to the depression degree of the accelerator pedal 17, while the secondary throttle valve 23 opens to the vacuum at the venturis 13 and 15. In more detail, the venturi vacuum introduced into the second chamber 31 of the servo means 26 draws the diaphragm piston 29 rightwardly against the force of the spring 36, and thus the control rod 34 is moved in the same direction to open the secondary throttle valve 23. The vacuum at the venturis 13 and 15 is generally proportional to the vehicle speed so that the secondary throttle valve 23 is urged into its opening direction with increasing of the venturi vacuum to cause an increase in engine power.

Assuming that the actual vehicle speed exceeds the predetermined limit vehicle speed, the second comparator 58 delivers an alarm signal to energize the first solenoid valve 40. This results in the passage 39 being connected to the passage 46, and then to the atmosphere, since the second solenoid valve 43 is now in the position illustrated in FIG. 1. Accordingly, the vacuum being introduced from the venturis 13 and 15 into the second chamber 31 of the servo means 26 is cancelled by the introduction of the atmosphere thereinto so that the secondary throttle valve 23 is urged in its closing direction to decrease the vehicle speed. Thus excessive vehicle speed travel will be prevented.

Next, when the driver manipulates the constant speed vehicle travel push-button, the establishing means 54 delivers a signal to energize the first solenoid valve 40. Thus the passage 39 now communicates with the passage 46. While the generator 50 actuates in accordance with the push-button so that the generator 50 delivers the desired vehicle speed responsive signal which is equal to the actual vehicle speed upon actuation of the push-button, the generator 50 may be actuated independently of the push-button. Now, the first comparator 51 receives both the actual and desired vehicle speed responsive signals for delivering the first instructive signal to energize the second solenoid valve 43 when the actual speed is slower than the desired vehicle speed. Therefore, the second chamber 31 of the servo means 26 is fluidically connected to the vacuum source through the port 38, the passage 39, the first solenoid valve 40, the passage 46, the second solenoid valve 43 and the passage 47. The vacuum thus introduced into the second chamber 31 opens the secondary throttle valve 23 to accelerate the actual vehicle speed. The first comparator 51 stops delivering the first instructive signal when the actual vehicle speed is faster than the desired vehicle speed, so that the second solenoid valve 43 is returned to its illustrated position of FIG. 1. This results in atmosphere being introduced into the second chamber 31 of the servo means 26 through the air-filter 45, the passage 44, the second solenoid valve 43, the passage 46, the first solenoid valve 40, the passage 39 and the port 38. By the introduction of atmosphere in the second chamber 31, the diaphragm piston 29 acts to close the secondary throttle valve 23 so that the actual vehicle speed is reduced.

As is clear from the description heretofore, it is unnecessary to actuate the primary throttle valve 16 in accordance with the accelerator pedal 17 during the constant speed vehicle travel condition.

The constant speed vehicle travel condition is released when the establishing means 54 is moved to its inoperative position. Otherwise, upon depression of the brake pedal, the valve 48 supplies atmospheric pressure to the second chamber 31 of the servo means 26 regardless of the position of the second solenoid valve 43, so that the constant speed vehicle travel condition is once released.

During the constant speed vehicle travel condition, when the actual vehicle speed exceeds the predetermined limit vehicle speed, the second comparator 58 delivers an alarm signal to open the normally closed switch 52. Thus the second solenoid valve 43 is held in its deenergized position. Therefore, the second chamber 31 of the servo means 26 communicates with the atmosphere through a first solenoid valve 40 which is now in its energized position so that the secondary throttle valve 23 is urged toward its closing direction to prevent excessive vehicle travel speed. If the driver establishes a desired vehicle speed above the predetermined limit vehicle speed, the normally-closed switch 52 is opened in the same manner as previously described when the actual vehicle speed exceeds the limit vehicle speed, whereby excessive vehicle speed travel is prevented.

Thus, because the system for limiting the excessive vehicle travelling speed is actuated independently of the primary throttle valve 16, the predetermined limit value must be established to be larger than the value of the vehicle speed at which the vehicle is able to travel when the primary throttle valve 16 is in its full opening position. However, it does not matter in practical application, because the predetermined limit value is generally established to be above one hundred kilometers per hour.

Figure 2:
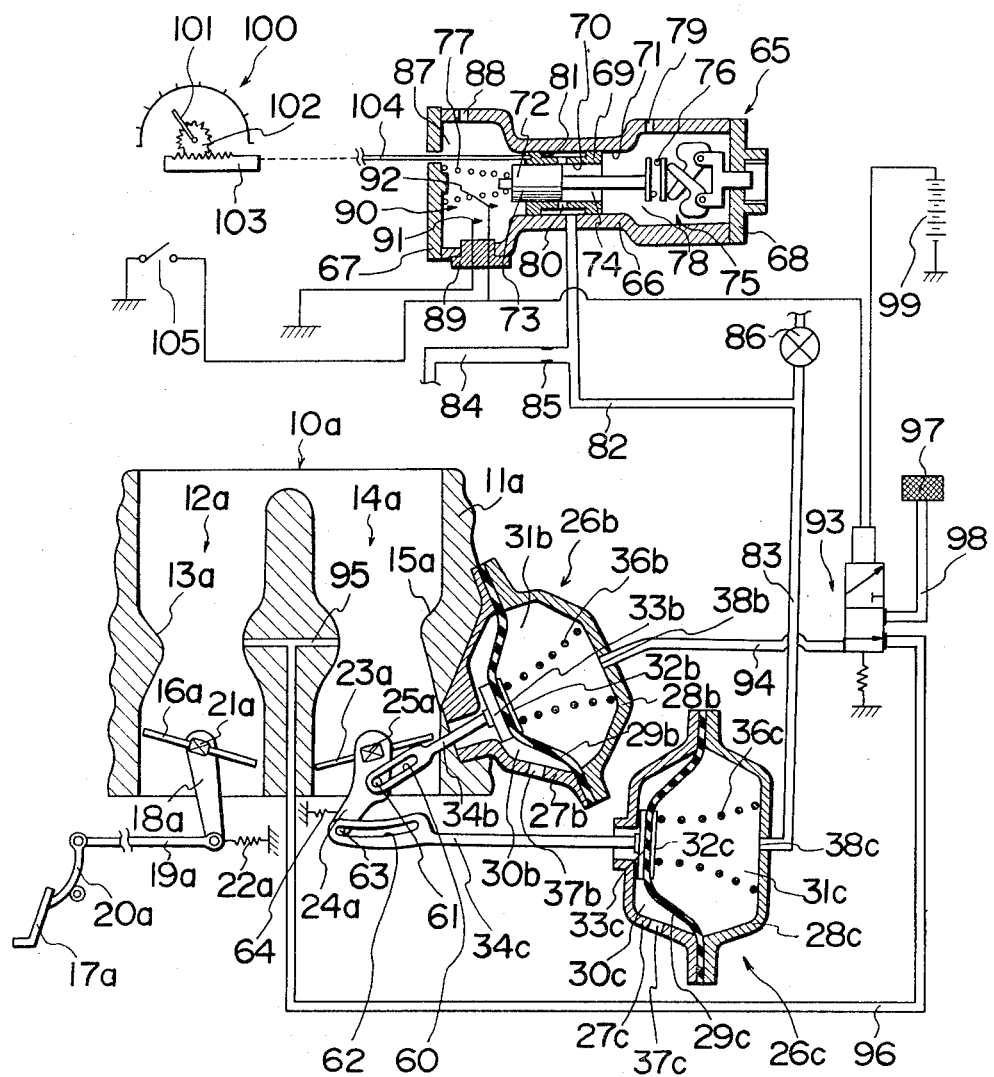
FIG. 2 is a view similar to FIG. 1 showing a further embodiment of the present invention.

A modified embodiment of the present invention is described with respect to FIG. 2, wherein like numerals with the suffix $a$ designate like parts. A first servo means 26$b$ operates for opening and closing the secondary throttle valve 23$a$ under normal vehicle travelling conditions. The construction of the first servo means 26$b$ is substantially the same as that of the servo means 26 of the first embodiment and, therefore, like numerals with the suffix $b$ designate like parts thereof. However, the control rod 34$b$ is formed with an elongated hole 60 in which rides a pin 61 mounted on the arm 24$a$. A second servo means 26$c$ is operative for opening and closing the secondary throttle valve 23$a$ under a constant speed of travel condition. The construction of the second servo means 26$c$ is substantially the same as that of the servo means 26 of the first embodiment and, therefore, like numerals with the suffix $c$ designate like parts therein. However, the control rod 34$c$ is formed with an elongated hole 62 in which rides a further pin 63 mounted on the arm 24$a$. A spring 64 biases the arm 24$a$ in its clockwise direction to close the secondary throttle valve 23$a$.

A pressure regulating device 65 comprises a housing 66 having a bore 71, end casings 67 and 68 attached to the housing 66, a sleeve member 69 slidably mounted in the bore 71 of the housing 66 and formed with a central bore 70 which receives a slidable spool valve 72 therein, and a centrifugal governor 75 movable proportionally to the actual vehicle speed in a conventional manner. The spool valve 72 has a rod 74 operatively connected to the governor 75 through a bearing 76, and thus the spool valve 72 is urged by the governor 75 in the left direction against the force of a spring 77. A land portion 73 of the spool valve 72 controls a radial opening 80 provided in the sleeve member 69 according to the relative position between the sleeve member 69 and the spool valve 72. Thus, fluid communication between the atmosphere and the second chamber 31$c$ of the second servo means 26$c$ is controlled through a port 79 formed in the housing 66, an atmospheric pressure chamber 78 therein, the opening 80, an annular chamber 81 formed in the outside periphery of the sleeve member 69, passages 82 and 83 and the port 38$c$. A branch passage 84 from the passage 82 having an orifice 85 therein connects to a vacuum source, such as the engine intake manifold or the venturi vacuum. A further branch passage from the passage 82 has a valve 86 associated with the brake pedal, not shown, which supplies atmospheric pressure into the second chamber 31$c$ of the second servo means 26$c$ upon depression of the brake pedal. A chamber 87 opens to atmosphere through a port 88 formed in the housing 66.

An excessive vehicle speed limiting means is provided which includes an insulator 89 fixed to the housing 66 and a switch 90 having a pair of contacts 91 and 92 is carried by the insulator 89. The contacts 91 and 92 are closed by the land 73 of the spool valve 72 when it is moved leftwardly by the governor 75 when the actual speed exceeds the limit vehicle speed, so that a solenoid changeover valve 93 is energized by an electric power source 99. Upon energization of the solenoid valve 93 a passage 94 connected to the venturis 13$a$ and 15$a$ through passages 95 and 96 is communicated with the atmosphere through a passage 98 and an air-filter 97, so that the secondary throttle valve 23$a$ is urged to its closing direction.

A desired vehicle speed setting means generally designated by numeral 100 has dial 101 which is rotated by the driver into a position corresponding to the desired vehicle speed, whereby a pinion gear 103 is moved through a gear 102. The movement of the pinion gear 103 moves the sleeve member 69 through a connecting rod 104 disposed therebetween, so that the sleeve member 69 is displaced into a position corresponding to the desired vehicle speed. A normally-open switch 105 closes in association with the setting means 100 to energize the solenoid valve 93. Thus the servo means 26$b$ is urged in to its inoperative position.

In addition, the operation of the first servo means 26$b$ should depend on the effective diameter of the diaphragm piston 29$b$ and the pressure difference between the chambers 30$b$ and 31$b$, depending on the force of the spring 36$b$, while the operation of the second servo means 26$c$ depends on the effective diameter of the diaphragm piston 29$c$, the pressure difference between the chambers 30$c$ and 31$c$ and the force of the spring 36c. Therefore, if there is a preference in the operation of the second servo means 26c over the first servo means 26b, under consideration of the above-mentioned conditions, it is not always necessary to provide the switch 105. Furthermore, the opening 80 of the sleeve member 69 will be maintained in its open condition when the setting means 100 is in its inoperative position so that the second servo means 26c is urged to its inoperative position, as shown in FIG. 2.

The desired vehicle speed setting means 100 also functions as the vehicle speed limit means by limitation of the maximum desired vehicle speed.

The operation of the modified embodiment of the present invention as previously described will be as follows:

During normal vehicle travel, the second chamber 31c of the second servo means 26c communicates with the atmosphere through the pressure regulating device 65 and, therefore, the second servo means 26c is held in its illustrated inoperative position. In this condition, the vehicle speed is controlled by the displacements of the primary and secondary throttle valves 16a and 23a connected, respectively, to the accelerator pedal 17a and the first servo means 26b. The first servo means 26b can be operated without interference of the second servo means 26c because the pin 63 on the arm 24a runs idle in the hole 62 of the control rod 34c of the second servo means 26c.

When the actual vehicle speed exceeds the set limit vehicle speed, the switch 90 is closed by the land 73 of the spool valve 72 in accordance with the movement of the governor 75 to energize the solenoid valve 93. Thus atmospheric pressure is introduced in the chamber 31b to prevent the vehicle from achieving an excessive speed.

Assume that the driver manipulates the dial 101 for the constant vehicle speed, the sleeve member 69 is moved leftwardly in response to the desired vehicle speed. At the same time the switch 105 closes to energize the solenoid valve 93. Therefore, the second chamber 31b of the first servo means 26b communicates with the atmosphere, and the first servo means 26b is now maintained in its inoperative position.

In this condition, when the actual vehicle speed is slower than the desired vehicle speed, the land 73 of the spool valve 72 which is urged leftwardly by the governor 75 closes the opening 80 so that the vacuum is introduced into the second chamber 31c of the second servo means 26c through passages 84, 82 and 83. The second servo means 26c now actuates to close the secondary throttle valve 23a.

On the contrary, the land 73 of the spool valve 72 opens the opening 80 when the actual vehicle speed is faster than the desired vehicle speed and thus atmospheric pressure is introduced into the second chamber 31c of the second servo means 26c. The second servo means 26c now actuates to open the secondary throttle valve 23a.

The constant vehicle travelling speed is released in substantially the same manner as previously described in the first embodiment of the present invention.

As will be evident from foregoing, the constant vehicle speed is attained by displacement of only the secondary throttle valve. According to an experiment, an automobile which is of the 2,000 cc class is able to travel with a throttle opening degree of one-half when it is travelling on an acclivity of 3 percent at one hundred kilometers per hour. Therefore, the constant vehicle speed travel system, according to the present invention, does not matter in practical application. It is noted that in the dual barrel type carburetor, furthermore, the secondary barrel is generally larger than the primary barrel.

The secondary throttle valve will be generally positioned in its full opening position by a vacuum of 20 mmHg so that the vacuum for actuating the secondary throttle valve is fully maintained even when the vehicle is travelling on the acclivity, whereby the throttle opening degree is increased so as to decrease the engine vacuum.

Various other modifications and variations of the present invention are obviously possible in light of the above teachings. It is to be understood therefore, that within the scope of the appended claims, the invention may be practiced otherwise than as specifically described herein.

What is claimed as new and desired to be secured by Letters Patent of the United States is:

1. A system for constant speed control of a vehicle comprising:
   an accelerator;
   a carburetor including primary and secondary barrels, each having a venturi;
   a primary throttle valve for said primary barrel, said primary throttle valve being mechanically connected to said accelerator;
   a secondary throttle valve for said secondary barrel;
   a vacuum servo means operatively connected to said secondary throttle valve and movable to effect movement of said secondary throttle valve;
   first conduit means for transmitting the venturi vacuum to said servo means;
   second conduit means for connecting said servo means to the atmosphere and to a vacuum source;
   means for establishing the desired vehicle speed;
   means for comparing the actual vehicle speed and the desired vehicle speed and for delivering an output signal corresponding thereto;
   first valve means disposed in said first and second conduit means for selectively opening and closing said first and second conduit means according to said establishing means; and
   second valve means disposed in said second conduit means for selectively connecting said servo means to the atmosphere and the vacuum source in response to said output signal.

2. A system as set forth in claim 1, wherein said servo means comprises:
   a housing;
   a spring biased diaphragm piston defining first and second chambers within said housing, said first chamber being maintained at atmospheric pressure and said second chamber being selectively communicated with said first and second conduit means; and
   a control rod for connecting said diaphragm piston to said secondary throttle valve.

3. A system as set forth in claim 2, further comprising:
   a further valve means associated with a brake pedal to introduce atmospheric pressure into said second chamber of said servo means upon depression of the brake pedal.

4. A system as set forth in claim 1, further comprising:
    means for limiting excessive vehicle speed which delivers an instructive signal to said second valve means when the actual vehicle speed exceeds a predetermined set limit value,
    whereby said servo means acts so as to close said secondary throttle valve through said second valve means.

5. A system for controlling the speed of a vehicle at a constant speed, comprising:
    an accelerator;
    a carburetor including primary and secondary barrels, each having a venturi;
    a primary throttle valve for said primary barrel, said first primary throttle valve mechanically connected to said accelerator;
    a secondary throttle valve for said secondary barrel
    a first vacuum servo means operatively connected to said secondary throttle valve and movable to effect movement of said secondary throttle valve;
    a first means for selectively communicating said first vacuum servo means to the venturi vacuum and the atmosphere
    a second vacuum servo means operatively connected to said secondary throttle valve and movable to effect movement of said secondary throttle valve;
    a second means for communicating said second vacuum servo means to the vacuum source and the atmosphere;
    means for establishing the desired vehicle speed operatively connected to said first means to control said first means; and
    means for comparing the actual vehicle speed and the desired vehicle speed to control said second means.

6. A system as set forth in claim 5, wherein each of said first and second vacuum servo means comprises:
    a housing;
    a spring biased diaphragm piston defining first and second chambers within said housing; and
    a control rod for connecting said diaphragm piston to said secondary throttle valve,
    said first chambers of said first and second servo means being maintained at atmospheric pressure and said second chamber of said first servo means being connected to said first means, and said second chamber of said second servo means being connected to said second means.

7. A system as set forth in claim 6, wherein each of said control rods is formed with an elongated hole in which a pin mounted on a lever rides, and said lever being connected to said secondary throttle valve.

8. A system as set forth in claim 6, further comprising a further valve means associated with a brake pedal to introduce atmospheric pressure into said second chamber of said second servo means upon depression of the brake pedal.

9. A system as set forth in claim 5, wherein said comparing means comprises:
    a housing having a bore;
    a sleeve member slidably mounted within said bore of said housing and having a bore, said sleeve member being associated with said establishing means;
    a centrifugal governor means movable proportionally to the actual vehicle speed; and
    a spool valve slidably mounted in said bore of said sleeve member and operatively connected to said governor means,
    whereby said second means for connecting said second servo means to the atmosphere is controlled in response to a relative position between said sleeve member and said spool valve.

* * * * *